US012576858B2

(12) United States Patent
Yan et al.

(10) Patent No.: US 12,576,858 B2
(45) Date of Patent: Mar. 17, 2026

(54) INTELLIGENT SETTINGS OF ONBOARD SENSORS ON A VEHICLE

(71) Applicant: International Business Machines Corporation, Armonk, NY (US)

(72) Inventors: Shunguo Yan, Austin, TX (US); Su Liu, Austin, TX (US); Zhennan Wang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

(21) Appl. No.: 18/658,093

(22) Filed: May 8, 2024

(65) Prior Publication Data

US 2025/0346240 A1 Nov. 13, 2025

(51) Int. Cl.
*B60W 50/00* (2006.01)

(52) U.S. Cl.
CPC . *B60W 50/0097* (2013.01); *B60W 2050/0083* (2013.01); *B60W 2420/403* (2013.01); *B60W 2420/408* (2024.01); *B60W 2420/54* (2013.01); *B60W 2552/15* (2020.02); *B60W 2556/50* (2020.02)

(58) Field of Classification Search
CPC ..... B60W 50/0097; B60W 2050/0083; B60W 2420/403; B60W 2420/408; B60W 2420/54; B60W 2552/15; B60W 2556/50
See application file for complete search history.

(56) References Cited

U.S. PATENT DOCUMENTS

| | | | |
|---|---|---|---|
| 2004/0201471 A1 | 10/2004 | Primm et al. | |
| 2017/0356769 A1 | 12/2017 | Williams et al. | |
| 2018/0039273 A1 | 2/2018 | Delp et al. | |
| 2018/0180719 A1 | 6/2018 | Bier | |
| 2019/0180502 A1* | 6/2019 | Englard | G06T 17/20 |
| 2020/0174469 A1 | 6/2020 | Trumpore et al. | |
| 2020/0209391 A1* | 7/2020 | Hu | G01S 17/08 |
| 2021/0208281 A1* | 7/2021 | Trofymov | G01S 17/89 |
| | | | 1/11 |
| 2022/0281456 A1* | 9/2022 | Giovanardi | B60W 30/18163 |
| 2022/0317254 A1 | 10/2022 | Chen et al. | |
| 2025/0247257 A1 | 7/2025 | Yan et al. | |

(Continued)

FOREIGN PATENT DOCUMENTS

| | | |
|---|---|---|
| CN | 112298205 A | 2/2021 |
| DE | 102019007492 A1 | 9/2020 |

OTHER PUBLICATIONS

Nissan Motor Corporation, Intelligent Around View Monitor, 2024, https://www.nissan-global.com/EN/INNOVATION/TECHNOLOGY/ARCHIVE/IAVM/.

(Continued)

*Primary Examiner* — Russell Frejd
*Assistant Examiner* — Brittany Renee Peko
(74) *Attorney, Agent, or Firm* — Garg Law Firm, PLLC; Rakesh Garg; Heather Schuler

(57) ABSTRACT

An embodiment includes detecting a future terrain metric by a vehicle. The embodiment includes responsive to detecting the future terrain metric, computing a sensor adjustment metric based on a current terrain metric and the future terrain metric. The embodiment also includes adjusting an onboard sensor of the vehicle based on the sensor adjustment metric.

20 Claims, 10 Drawing Sheets

(56)            References Cited

U.S. PATENT DOCUMENTS

2025/0336240 A1* 10/2025 Hashimoto ............ G07C 5/006

OTHER PUBLICATIONS

Bruce et al., An Extensible Sensor based Inferencing Framework for Context Aware Applications, 2010 10th IEEE International Conference on Computer and Information Technology, Jun. 29, 2010-Jul. 1, 2010.
Osterweil et al., The Extensible Sensing System, 2003.
Gao et al., Ultra-Robust and Extensible Fibrous Mechanical Sensors for Wearable Smart Healthcare, May 2022.
Zhang et al., On-skin ultrathin and stretchable multifunctional sensor for smart healthcare wearables, Feb. 8, 2022.
Towards AI, Tesla's Self Driving Algorithm Explained, May 27, 2022, https://towardsai.net/p/l/teslas-self-driving- algorithm-explained.
Al-Qizwini et al., Deep learning algorithm for autonomous driving using GoogleNet, 2017 IEEE Intelligent Vehicles Symposium (IV), Jun. 11-14, 2017.
Barla, Self-Driving Cars with Convolutional Neural Networks (CNN), Aug. 10, 2023, https://neptune.ai/blog/self-driving-cars-with-convolutional-neural-networks-cnn.
Mindy Support, How Machine Learning in Automotive Makes Self-Driving Cars a Reality, Feb. 12, 2020, https://mindy-support.com/news-post/how-machine-learning-in-automotive-makes-self-driving-cars-a-reality/.
Artificial Intelligence, Path Planning for Self-Driving Cars, Jul. 17, 2018, https://www.thinkautonomous.ai/blog/path-planning-for-self-driving-cars/.

Hogan, Autonomous Vehicles and Weather: What You Need to Know, Nov. 15, 2023, https://www.tomorrow.io/blog/autonomous-vehicles-and-weather-what-you-need-to-know/.
Vargas et al., An Overview of Autonomous Vehicles Sensors and Their Vulnerability to Weather Conditions, Aug. 10, 2021.
Yin et al., When to use what data set for your self-driving car algorithm: An overview of publicly available driving datasets, 2017 IEEE 20th International Conference on Intelligent Transportation Systems (ITSC), Oct. 16-19, 2017.
Mohammed et al., The Perception System of Intelligent Ground Vehicles in AllWeather Conditions: A Systematic Literature Review, Nov. 15, 2020.
Iqbal et al., Design of multifunctional autonomous car using ultrasonic and infrared sensors, 2017 International Symposium on Wireless Systems and Networks (ISWSN), Nov. 19-22, 2017.
World Highways, Reflective road markings improve visibility, safety, Feb. 13, 2012, https://www.worldhighways.com/wh11/feature/reflective-road-markings-improve-visibility-safety.
Purdue College of Engineering, IoT for the DOT: Smart infrastructure comes to highway paving, Apr. 1, 2020, https://medium.com/purdue-engineering/iot-for-the-dot-smart-infrastructure-comes-to-highway-paving-4bc81ceb9c8d.
Mazhandu, IoT Applications in Construction, Jul. 12, 2020, https://www.iotforall.com/iot-applications-construction.
Xu et al., Methods of Combining Multiple Classifiers and Their Applications to Handwriting Recognition, May/Jun. 1992.
Mohandes et al., Classifiers Combination Techniques: A Comprehensive Review, Apr. 11, 2018.
Wilson et al., Predictive Inequity in Object Detection, Feb. 21, 2019.

* cited by examiner

500

DETECTING A FUTURE TERRAIN METRIC 510

DETERMINE WHICH SENSOR REQUIRES ADJUSTMENT 520

COMPUTING A DIFFERENCE BETWEEN THE CURRENT TERRAIN METRIC AND FUTURE TERRAIN METRIC 530

DETERMINE ADJUSTMENT METRIC FOR A SENSOR 540

SEND ADJUSTMENT METRIC TO SENSOR CONTROLLER 550

| HD MAP OUTPUT | SENSOR HEIGHT (CM) | SENSOR ANGLE (DEGREES) | SENSOR ROTATION (DEGREES) |
|---|---|---|---|
| 38.8901225975 0874,<br>77.0090719600 1525-<br>33.0234224 2352532 | 60 | 0 | 0 |
| 38.8901225975 0874,<br>77.0090719600 1525-<br>33.0234224 2352533 | 50 | 15 | 120 |
| 38.8901225975 0874,<br>77.0090719600 1525-<br>33.0234224 2352535 | 40 | 45 | 120 |

700

| PERIOD | POSITION | VehicleID | TIME | SPEED (KM/HR) | ROAD CONDITION | WEATHER | SENSOR LOCATION | SENSOR ADJUSTMENT HEIGHT /ANGLE /ROTATION | VEHICLE CENTER OF GRAVITY | RIDER FEEDBACK |
|---|---|---|---|---|---|---|---|---|---|---|
| 1 | 38.8901225975 0874,-77.0090 7196001525-33.02342242 4352532 | 0123 | 23:01 | 45 | TURN | SUNNY | WINDSHIELD | 45/120/0 | 10.57 | GOOD |
| 2 | 38.8901225975 0874,-77.0090 7196001525-33.02342242 4352532 | 0001 | 10:05 | 35 | SLOPE | SNOW | LEFT FRONT | 90/20/25 | 51.33 | BAD |
| 3 | 38.8901225975 0874,-77.0090 7196046457-33.02342242 4235232 | 0001 | 20:04 | 110 | MOUNTAIN TURN | ICE | LEFT MIDDLE | 25/120/110 | 11.04 | SCARY | d1 – DISTANCE FROM THE CURRENT POSITION TO THE TOP
d2 – DETECT DISTANCE FROM THE TOP
c – TOP ARC CHORD
$\alpha$ – UP SLOPE ANGLE
$\beta$ – SENSOR ANGLE (DOWN SLOPE ANGLE)
h – SENSOR HEIGHT, $h = (d1.\cos\alpha + d2.\cos\beta + c).\tan\beta$

1000

TERRAIN SENSOR
1010

COMPUTE  TERRAIN METRIC COMPONENT
1020

ADJUSTMENT OPTIMIZATION COMPONENT
1040

SENSOR CONTROLLER
1060

CPU
1080

INTELLIGENT SETTINGS OF ONBOARD SENSORS ON A VEHICLE

BACKGROUND

The present invention relates generally to artificial intelligence. More particularly, the present invention relates to a method, system, and computer program for Intelligent Settings of Onboard Sensors on a Vehicle.

Sensors on a vehicle provide added safety to the occupants and assistance to the driver. Autonomous vehicles (AVs) use sensors to partially or entirely replace the human driver in navigating a vehicle from an origin to a destination while avoiding road hazards and responding to traffic conditions. Currently, AV companies are trying to pass Level 3 self-driving (conditional automation) that relies on drivers to assume control when the AV can no longer operate the vehicle. Experts in the fields estimated that Levels 4 and 5 (high and full automation, respectively) could be several decades away.

SUMMARY

The illustrative embodiments provide for Intelligent Settings of Onboard Sensors on a Vehicle. An embodiment includes detecting a future terrain metric by a vehicle. The embodiment includes responsive to detecting the future terrain metric, computing a sensor adjustment metric based on a current terrain metric and the future terrain metric. The embodiment also includes adjusting an onboard sensor of the vehicle based on the sensor adjustment metric.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 6 depicts a table in accordance with an illustrative embodiment;

DETAILED DESCRIPTION

Figure 1:
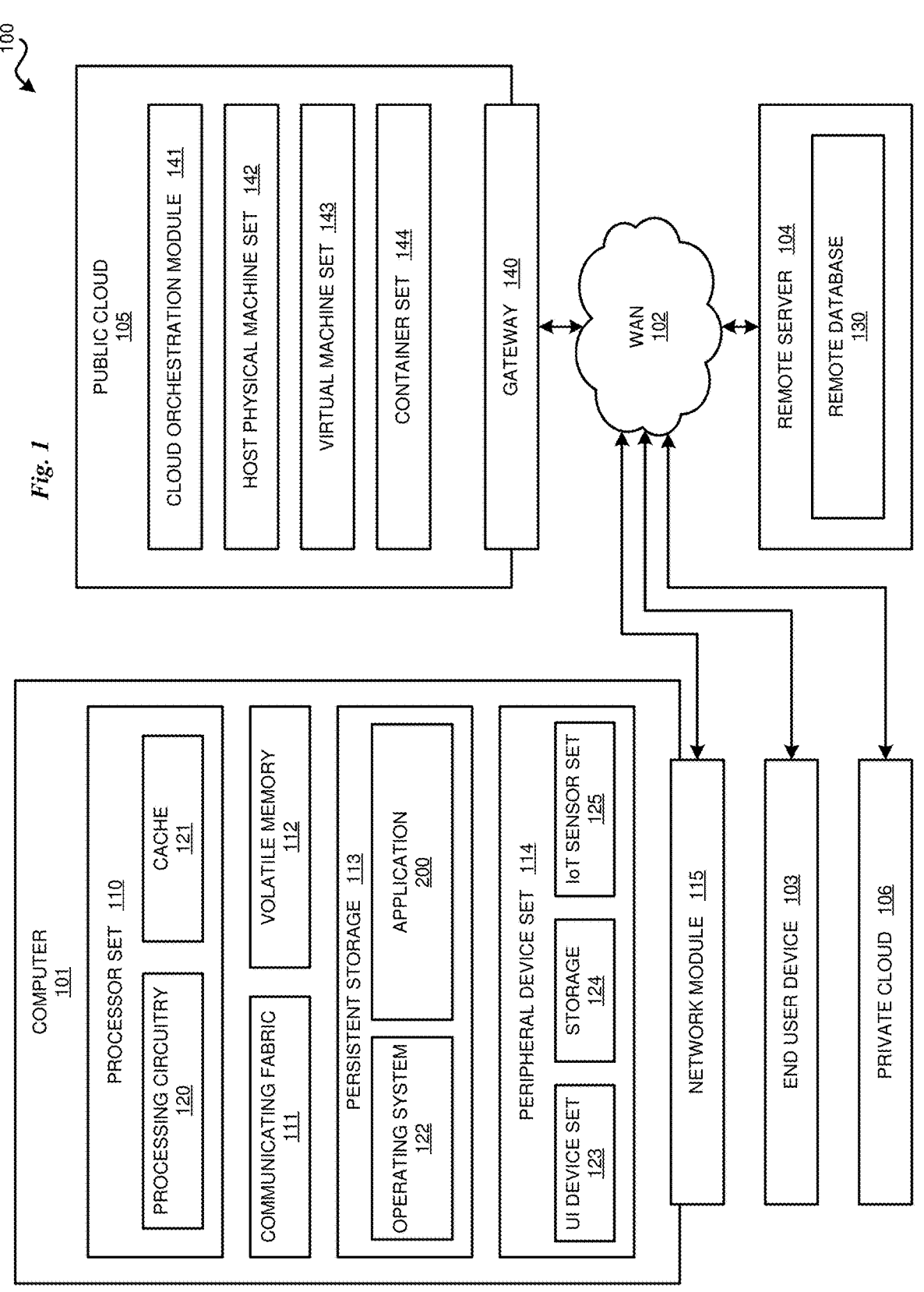
FIG. 1 depicts a block diagram of a computing environment in accordance with an illustrative embodiment.

Sensors on a vehicle provide added safety to the occupants and assistance to the driver. Autonomous vehicles (AVs) use sensors to partially or entirely replace the human driver in navigating a vehicle from an origin to a destination while avoiding road hazards and responding to traffic conditions. Currently, AV companies are trying to pass Level 3 self-driving (conditional automation) that relies on drivers to assume control when the AV can no longer operate the vehicle. Experts in the fields estimated that Levels 4 and 5 (high and full automation, respectively) could be several decades away.

The present disclosure provides a method, a machine-readable medium, and a system for Intelligent Settings of Onboard Sensors on a Vehicle. An embodiment includes detecting a future terrain metric by a vehicle. The embodiment includes responsive to detecting the future terrain metric, computing a sensor adjustment metric based on a current terrain metric and the future terrain metric. The embodiment also includes adjusting an onboard sensor of the vehicle based on the sensor adjustment metric.

Illustrative embodiments include wherein the future terrain metric comprises a feature of a terrain on which the vehicle is moving.

Illustrative embodiments include wherein the onboard sensor is selected from the group consisting of a vision-based sensor, a radar-based sensor, an audio-based sensor, a satellite-based sensor, a cloud-based sensor and a light-based sensor.

Illustrative embodiments include wherein the onboard sensor is configured to be adjusted angularly, radially, vertically and horizontally.

Illustrative embodiments include wherein the sensor adjustment metric comprises a sensor height, a sensor angle, and a sensor rotation.

Illustrative embodiments include wherein the sensor adjustment metric is optimized comprising training a machine learning model based on vehicle information, sensor data, sensor location, road condition, weather and user feedback.

Illustrative embodiments also include wherein the computing the sensor adjustment metric comprises training a machine learning model based on the current terrain metric and the future terrain metric.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Data center environment 100 contains an example of an environment for the execution of at least some of the computer code involved in performing the inventive methods, such as an Application module 200 that provides Intelligent Settings of Onboard Sensors on a Vehicle. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made. Available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of Application Programming Interfaces (API). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

Terrain changes affect vision, focus, range, coverage etc. of a vehicle onboard sensor (e.g., camera), and may cause blind spots in the coverage. The onboard sensors may be unable to focus on the road or their detection range and coverage may be reduced, resulting in sensed data that is noisy and misperceived.

Figure 2:
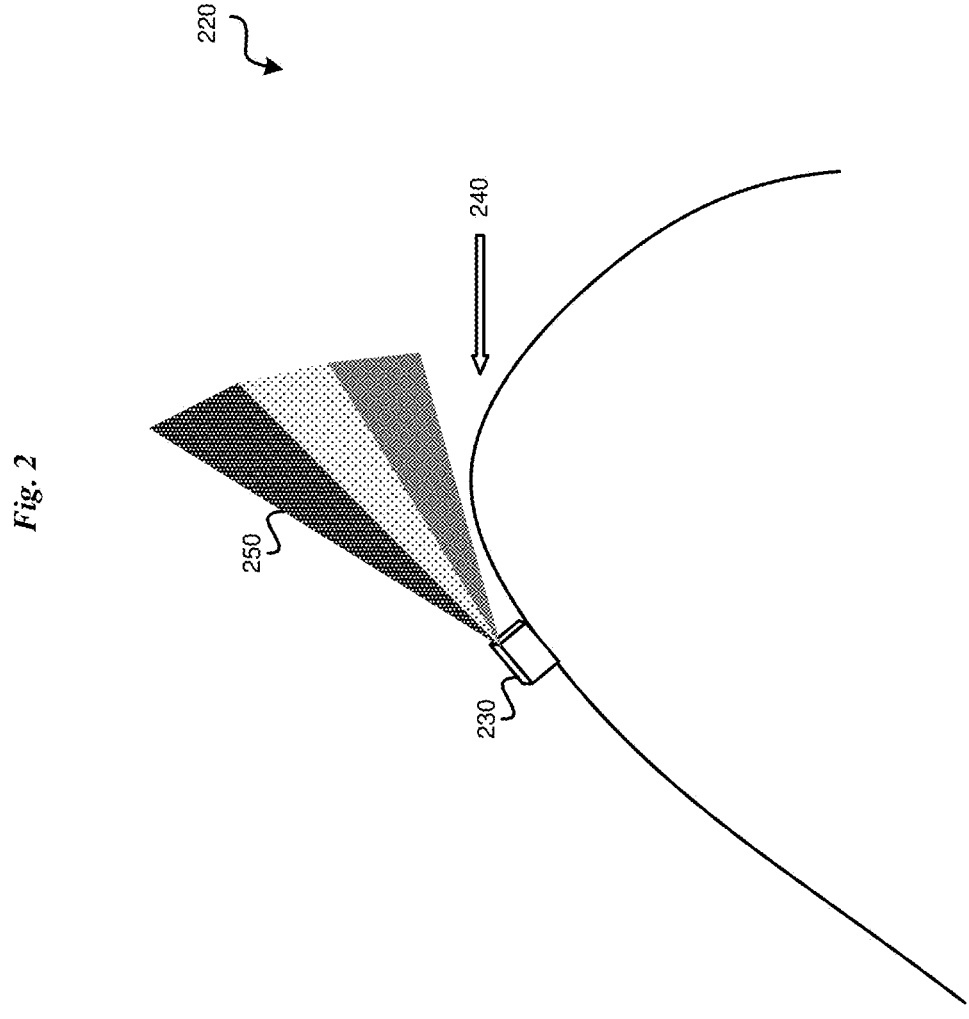
FIG. 2 depicts a diagram in an environment in accordance with an illustrative embodiment.

FIG. 2 depicts a diagram in an environment in accordance with an illustrative embodiment. In a particular embodiment, the diagram 220 shows aspects of the application 200 of FIG. 1.

In the illustrated embodiment, a vehicle with an onboard sensor 230 is moving up a slope 240. A blind spot 250 is created since the onboard sensor cannot sense the road.

Figure 3:
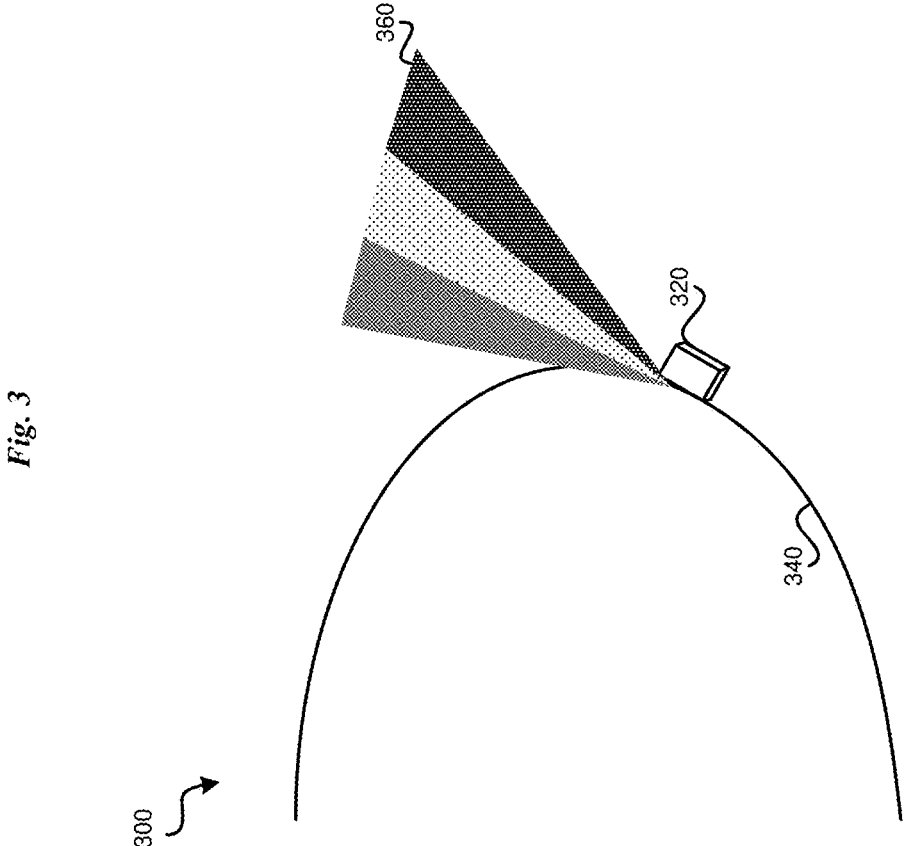
FIG. 3 depicts a diagram in an environment in accordance with an illustrative embodiment.

FIG. 3 depicts a diagram in an environment in accordance with an illustrative embodiment. In a particular embodiment, the components of the diagram 300 shows aspects of the application 200 of FIG. 1.

In the illustrated embodiment, a vehicle with an onboard sensor 320 is moving around a bend 340. A blind spot 360 is created since the onboard sensor cannot sense the road.

Figure 4:
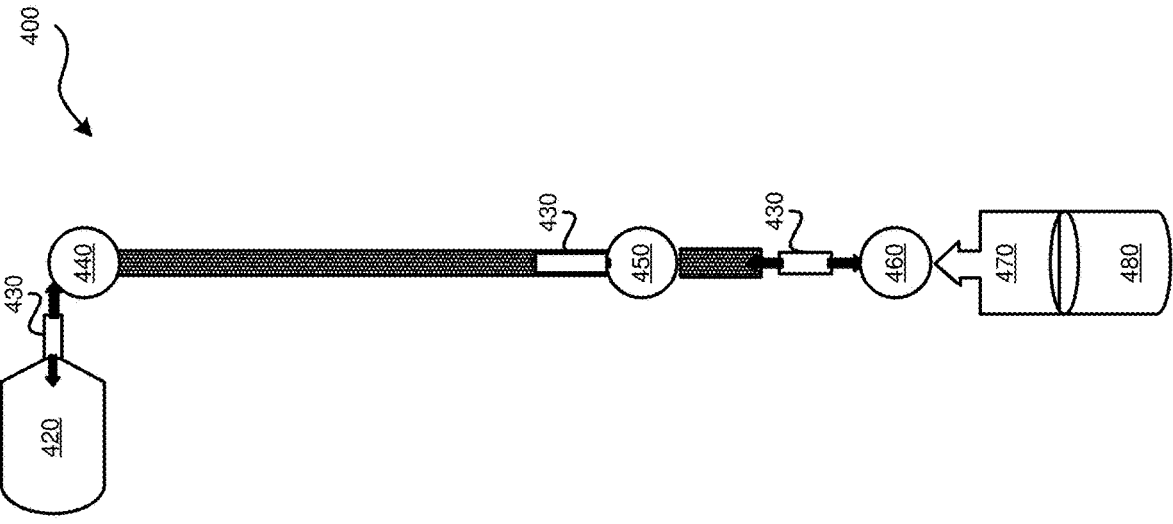
FIG. 4 depicts a diagram in accordance with an illustrative embodiment.

FIG. 4 depicts a diagram in accordance with an illustrative embodiment. In a particular embodiment, the components 400 are representative of aspects of the application 200 of FIG. 1.

In the illustrated embodiment, an onboard sensor 420 is mounted to a sensor direction rotation motor 440 that is mounted to an arm comprising an extension and contraction motor 450, joints 430 and an arm direction rotation motor 460. The arm is also mounted on a step motor 470 and a step motor controller 480. In some embodiment, the onboard sensor may be configured to be adjusted angularly, radially, vertically and horizontally. In another embodiment, when the vehicle moves to a specific location, the arm(s) of selected sensors extends and/or rotates to the length and angle determined based on terrain characteristics so the sensor can focus on the center of the road and prevent blind spots therefore improving the operation of the sensor. The sensors contract to their original/default positions and angles once the road condition changes to normal level surface. It should be noted that the motors, joints and controllers are for illustrative purposes, and other devices or mechanisms with similar features may also be used.

Figure 5:
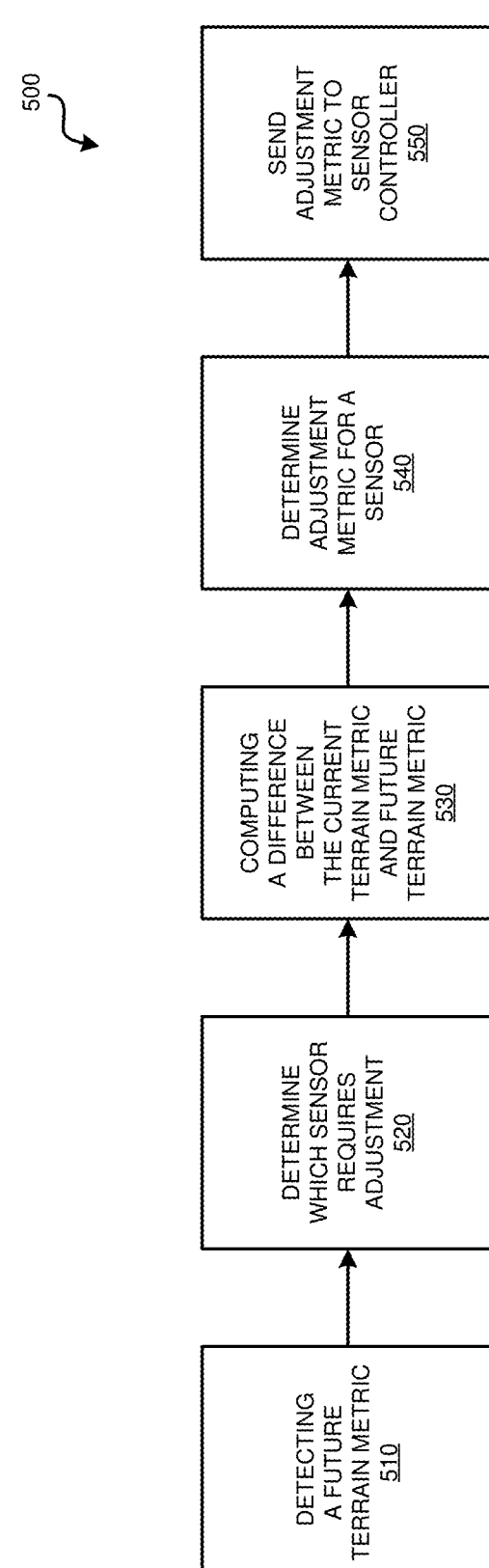
FIG. 5 depicts a flowchart diagram in accordance with an illustrative embodiment.

FIG. 5 depicts a flowchart diagram in accordance with an illustrative embodiment. In a particular embodiment, the components 500 are representative of aspects of the application 200 of FIG. 1.

In the illustrated embodiment, a detecting a future terrain metric by an onboard sensor of a vehicle occurs at block 510. In embodiments, the onboard sensor of the vehicle may comprise driver assistance, for example cruise control to full automation, for example, where the onboard sensor provides for operation of the vehicle without driver interaction. The future terrain metric comprises a feature of a terrain on which the vehicle is moving. For example, the terrain metric may comprise the topography, and road features such as road shape, and road markings. In some embodiments, the detecting the future terrain metric comprises an output of a high-definition (HD) map, and vehicle onboard real time sensors including vision-based sensors, radar-based sensors, audio-based sensors, cloud-based sensors, satellite-based sensors including Global Positioning System (GPS) or light-based sensors. It is to be understood that in embodiments, the onboard sensors described herein may be adjusted to perform real time sensing many times a second. For example, a light-based sensor, Light Detection and Ranging (LiDAR) may be adjusted and sense at least 25 times a second. At block 520, the step to determine which sensor requires adjustment is performed. This may comprise an indication from the sensor that adjustment is required or an indication of a terrain change as described herein such as from the HD map that a sensor adjustment is needed. At block 530, computing a difference between the current terrain metric and a future terrain metric is performed which may be used to determine an adjustment metric for a sensor at block 540. In embodiments, the sensor adjustment metric comprises a sensor height, a sensor angle, and a sensor rotation. At block 550, the sensor adjustment metric is sent to the sensor controller to perform adjustments to the sensor.

FIG. 6 depicts a table in accordance with an illustrative embodiment. In a particular embodiment, the components 600 are representative of aspects of the application 200 of FIG. 1.

In the illustrated embodiment, the sensor adjustment metric may be computed based on the relative difference between the current terrain metric and a future terrain metric as indicated by outputs of a HD map.

In other embodiments, the sensor adjustment metric may be determined based on the difference between the current terrain metric and a future terrain metric as indicated in the figures below. In some embodiments, computing the sensor adjustment metric comprises training a machine learning model based on the current terrain metric and the future terrain metric. For example, the machine learning model may execute algorithms to predict the sensor adjustment metric to position the sensor based on the current terrain metric, the future terrain metric, sensor type, weather and the vehicle metrics such as speed, and center of gravity.

Figure 7:
FIG. 7 depicts a table in accordance with an illustrative embodiment.

FIG. 7 depicts a table in accordance with an illustrative embodiment. In a particular embodiment, the components 700 are representative of aspects of the application 200 of FIG. 1.

In the illustrated embodiment, the sensor adjustment metric is optimized comprising training a machine learning model based on vehicle information, sensor data, road condition, weather, and user feedback, which may be collected on the same or similar road and weather condition. For example, as shown in the table of FIG. 7, data is collected for each sensor adjustment, including the time, locations, weather conditions, sensor types and adjustments, vehicle status (e.g., speed, center of gravity), and rider feedback. This data is inputted into a machine learning model to compute a best adjustment of a specific sensor in certain road conditions to further optimize the sensors' adjustment in the future. In an embodiment, certain data points may be weighed to give greater or less weight to these data points in the computing by the machine learning model. For example, the rider feedback may be given less weight if the road condition data has been collected.

Figure 8:
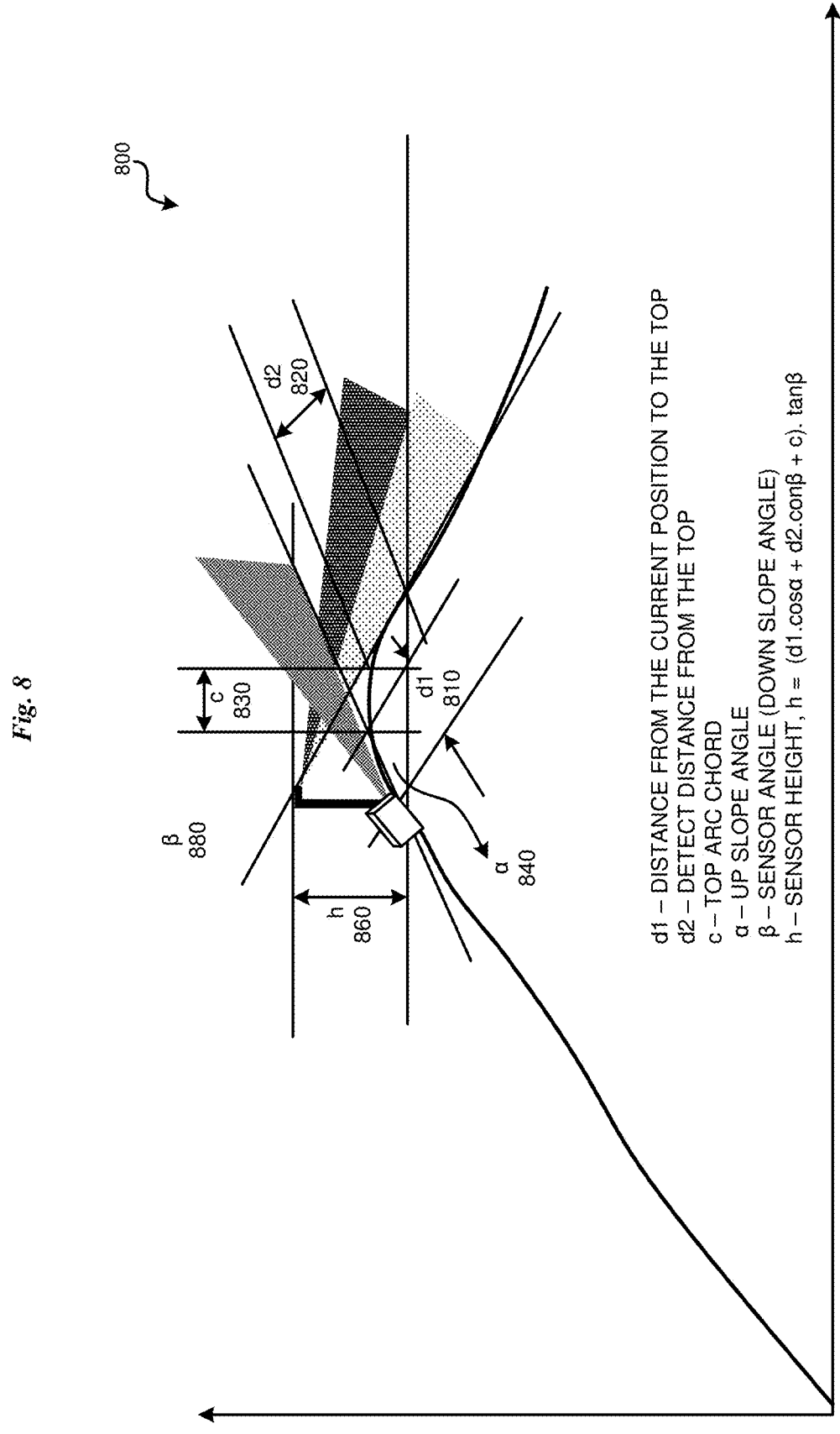
FIG. 8 depicts a diagram in accordance with an illustrative embodiment.

FIG. 8 depicts a diagram in accordance with an illustrative embodiment. In a particular embodiment, the components 800 are representative of aspects of the application 200 of FIG. 1.

In the illustrated embodiment, a vehicle with an onboard sensor moving up a hill. The sensor adjustment metric may be determined by computing the difference between the current terrain metric and a future terrain metric by applying geometrical measurements of the terrain. In the embodiment, geometrical computations are performed to calculate the distance of the current position to the top of the hill (d1) 810, distance from the top to a location downslope (d2) 820, the top arc chord (c) 830, the upslope angle ($\alpha$) 840, the sensor angle ($\beta$) 880, and the sensor height (h) 860, which for example may be expressed as h=(d1·cos ($\alpha$)+d2·cos ($\beta$)+c)·tan 3.

Figure 9:
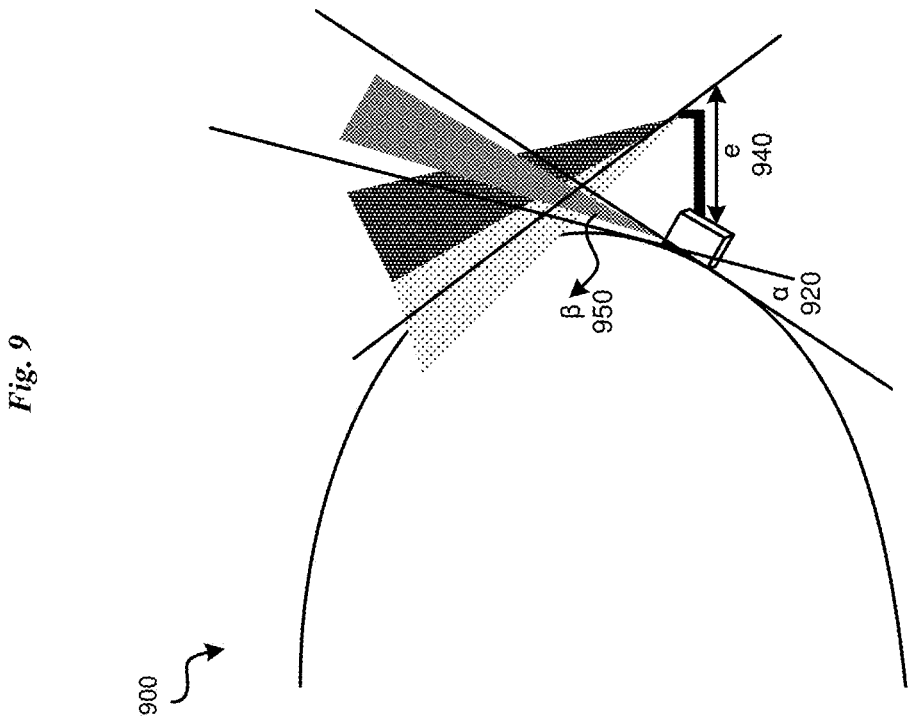
FIG. 9 depicts a diagram in accordance with an illustrative embodiment.

FIG. 9 depicts a diagram in accordance with an illustrative embodiment. In a particular embodiment, the components 900 are representative of aspects of the application 200 of FIG. 1.

In the illustrated embodiment, a vehicle with an onboard sensor is moving around a bend. The sensor adjustment metric may be determined by computing the difference between the current terrain metric and a future terrain metric by applying geometrical measurements of the terrain. In the embodiment, geometrical computations to determine ($\alpha$) 920 and ($\beta$) 950 and height of the sensor (e) 940 are performed.

Figure 10:
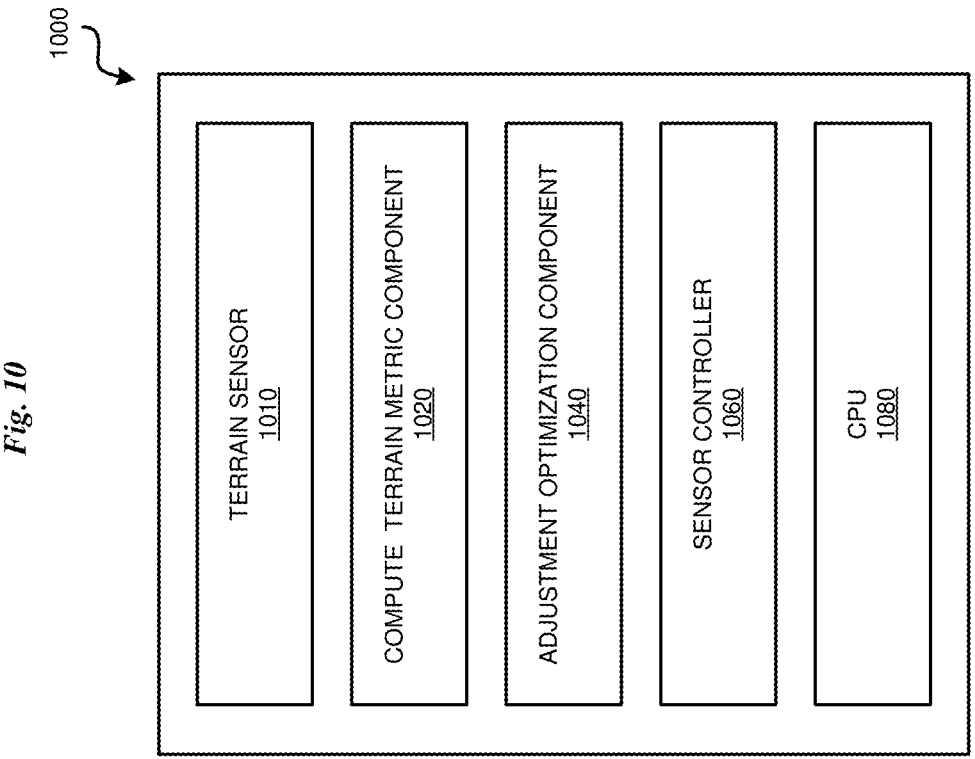
FIG. 10 depicts a system diagram in accordance with an illustrative embodiment.

FIG. 10 depicts a system diagram in accordance with an illustrative embodiment. In a particular embodiment, the components 1000 are representative of aspects of the application 200 of FIG. 1.

In the illustrated embodiment, the system comprises a terrain sensor 1010, a compute terrain metric component 1020, an adjustment optimization component 1040, a sensor controller 1060, and a central processing unit (CPU) 1080.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
detecting a future terrain metric by a vehicle;
responsive to detecting the future terrain metric, computing a sensor adjustment metric based on a current terrain metric and the future terrain metric; and
adjusting an onboard sensor of the vehicle based on the sensor adjustment metric wherein the sensor adjustment metric is optimized comprising training a machine learning model based on vehicle information, sensor data, sensor location, road condition data, weather data and user feedback to output an optimized sensor adjustment metric, the training further comprising weighing at least one of the vehicle information, the sensor data, the sensor location, the road condition data, and the weather data against user feedback.

2. The computer-implemented method of claim 1, wherein the future terrain metric comprises a feature of a terrain on which the vehicle is moving.

3. The computer-implemented method of claim 1, wherein the onboard sensor is selected from a group consisting of a vision-based sensor, a radar-based sensor, an audio-based sensor, a satellite-based sensor, a cloud-based sensor and a light-based sensor.

4. The computer-implemented method of claim 1, wherein the onboard sensor is adjusted angularly, radially, vertically and horizontally.

5. The computer-implemented method of claim 1 wherein the sensor adjustment metric comprises a sensor height, a sensor angle, and a sensor rotation.

6. The computer-implemented method of claim 1, the training further comprising weighing the user feedback less than weighing one of the vehicle information, the sensor data, the sensor location, the road condition data, and the weather data.

7. The computer-implemented method of claim 1, wherein the computing the sensor adjustment metric comprises training the machine learning model based on the current terrain metric and the future terrain metric.

8. A non-transitory computer readable medium comprising a computer program comprising machine readable instructions that, when executed by a processor, performs:

detecting a future terrain metric by a vehicle;

responsive to detecting the future terrain metric, computing a sensor adjustment metric based on a current terrain metric and the future terrain metric; and adjusting an onboard sensor of the vehicle based on the sensor adjustment metric wherein the sensor adjustment metric is optimized comprising training a machine learning model based on vehicle information, sensor data, sensor location, road condition data, weather data and user feedback to output an optimized sensor adjustment metric, the training further comprising weighing at least one of the vehicle information, the sensor data, the sensor location, the road condition data, and the weather data against user feedback.

9. The non-transitory computer readable medium of claim 8, wherein the future terrain metric comprises a feature of a terrain on which the vehicle is moving.

10. The non-transitory computer readable medium of claim 8, wherein the onboard sensor is selected from a group consisting of a vision-based sensor, a radar-based sensor, an audio-based sensor, a satellite-based sensor, a cloud-based sensor and a light-based sensor.

11. The non-transitory computer readable medium of claim 8, wherein the onboard sensor is adjusted angularly, radially, vertically and horizontally.

12. The non-transitory computer readable medium of claim 8, wherein the sensor adjustment metric comprises a sensor height, a sensor angle, and a sensor rotation.

13. The non-transitory computer readable medium of claim 8, the training further comprising weighing the user feedback less than weighing one of the vehicle information, the sensor data, the sensor location, the road condition data, and the weather data.

14. The non-transitory computer readable medium of claim 8, wherein the computing the sensor adjustment metric comprises training the machine learning model based on the current terrain metric and the future terrain metric.

15. A computer system comprising a processor and one or more computer readable storage media, and program instructions collectively stored on the one or more computer readable storage media, the program instructions executable by the processor to cause the processor to perform operations comprising:

detecting a future terrain metric by a vehicle;

responsive to detecting the future terrain metric, computing a sensor adjustment metric based on a current terrain metric and the future terrain metric; and adjusting an onboard sensor of the vehicle based on the sensor adjustment metric wherein the sensor adjustment metric is optimized comprising training a machine learning model based on vehicle information, sensor data, sensor location, road condition data, weather data and user feedback to output an optimized sensor adjustment metric, the training further comprising weighing at least one of the vehicle information, the sensor data, the sensor location, the road condition data, and the weather data against user feedback.

16. The computer system of claim 15, wherein the onboard sensor is selected from a group consisting of a vision-based sensor, a radar-based sensor, an audio-based sensor, a satellite-based sensor, a cloud-based sensor and a light-based sensor.

17. The computer system of claim 15, wherein the onboard sensor is adjusted angularly, radially, vertically and horizontally.

18. The computer system of claim 15, wherein the sensor adjustment metric comprises a sensor height, a sensor angle, and a sensor rotation.

19. The computer system of claim 15, the training further comprising weighing the user feedback less than weighing one of the vehicle information, the sensor data, the sensor location, the road condition data, and the weather data.

20. The computer system of claim 15, wherein the computing the sensor adjustment metric comprises training the machine learning model based on the current terrain metric and the future terrain metric.

* * * * *